Figure 24:
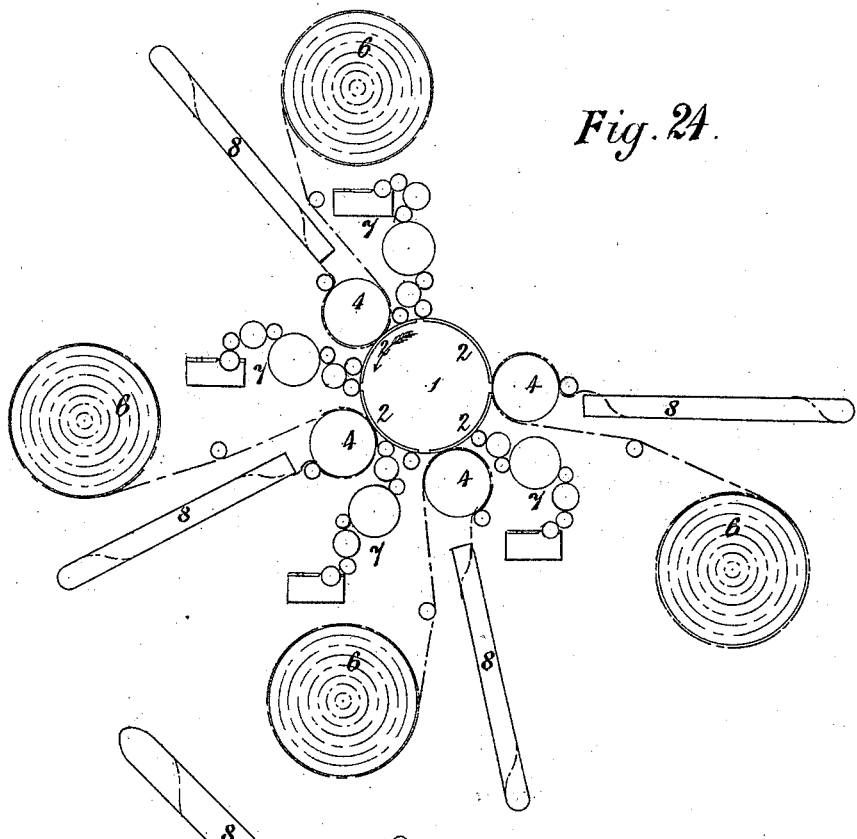

10 Sheets—Sheet 1.
E. ANTHONY & W. W. TAYLOR.
Printing-Machine.
No. 212,880. Patented Mar. 4, 1879.
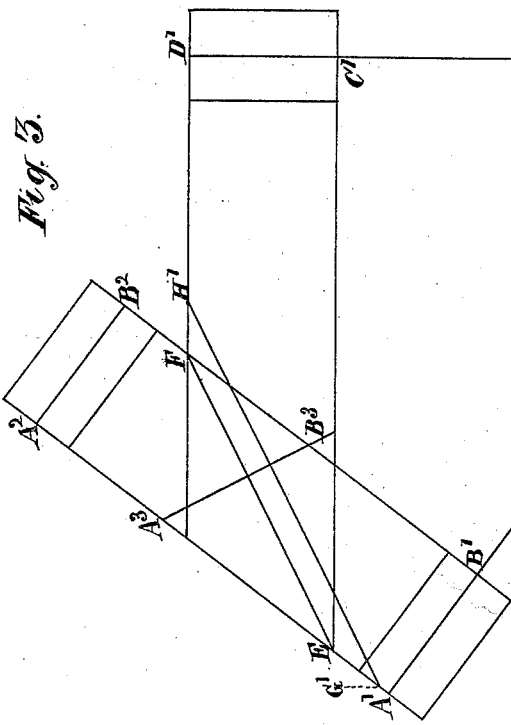
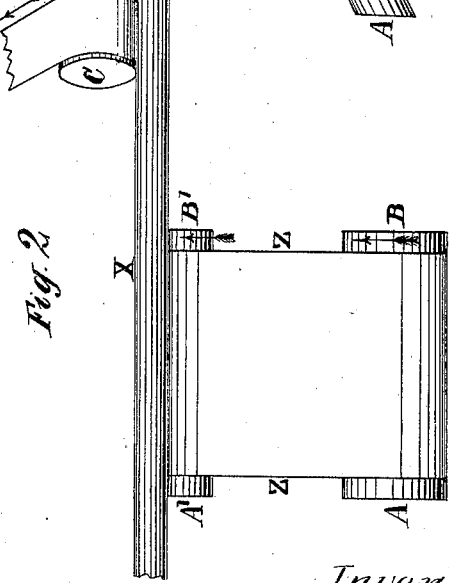
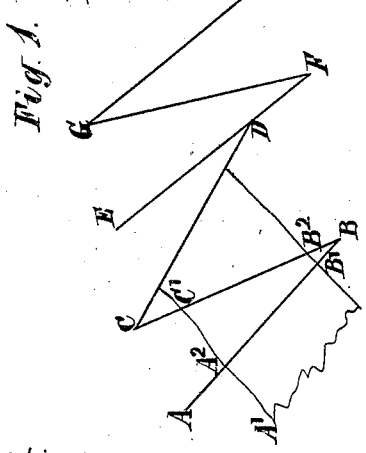
Witnesses
Hermann Moessner
Harry Smith
Inventors
Edwyn Anthony
and
William Wilberforce Taylor
by their Attorneys
Howson and Son 10 Sheets—Sheet 2.
E. ANTHONY & W. W. TAYLOR.
Printing-Machine.
No. 212,880. Patented Mar. 4, 1879.
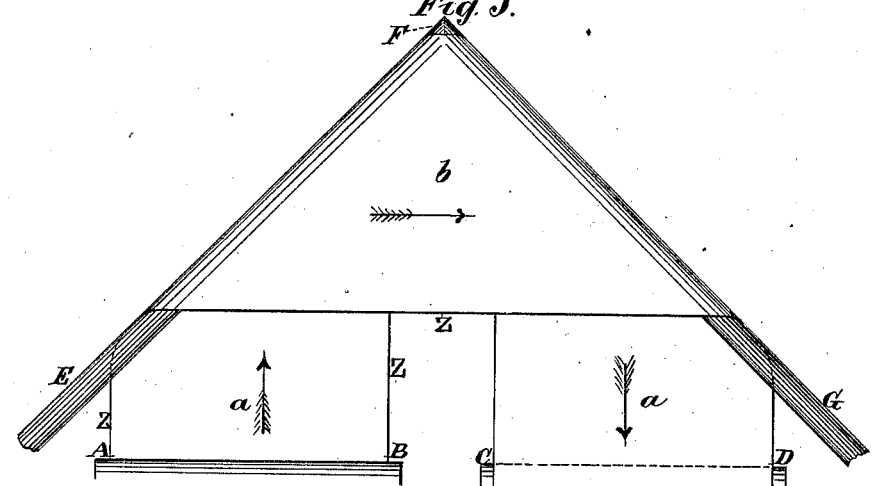
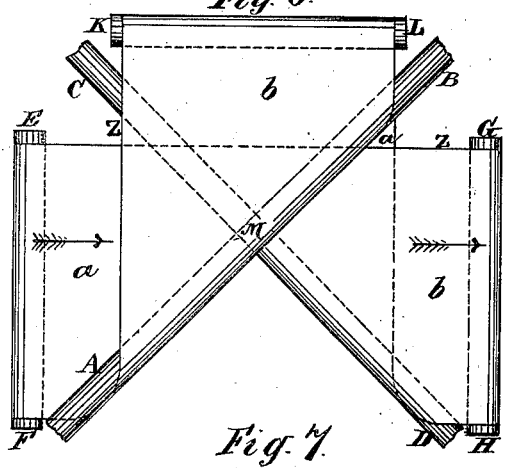
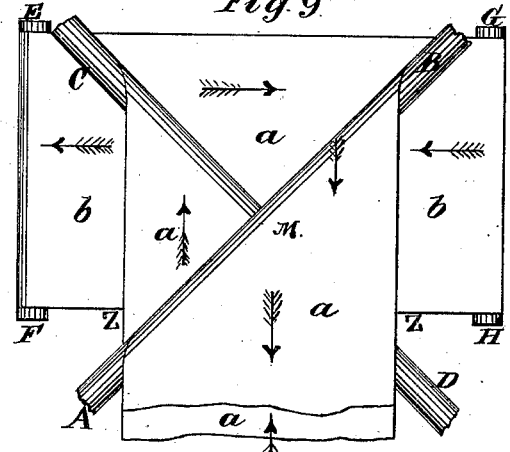
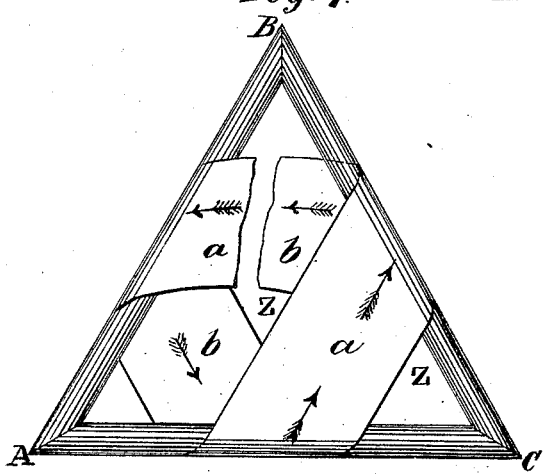
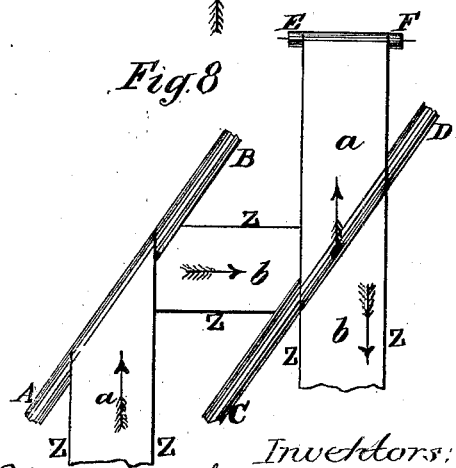
Witnesses
Hermann Moesener
Harry Smith
Inventors:
Edwyn Anthony
and
William Wilberforce Taylor
by their Attorneys
Howson and Son E. ANTHONY & W. W. TAYLOR.
Printing-Machine.
No. 212,880. Patented Mar. 4, 1879.
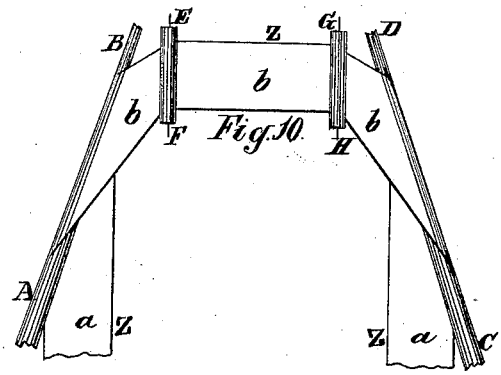
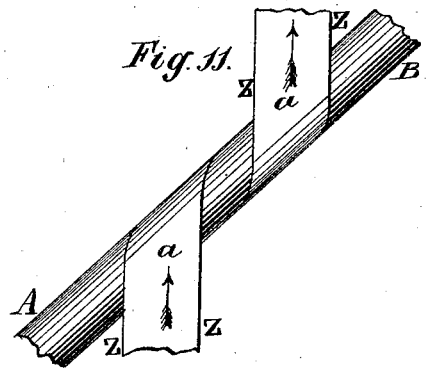
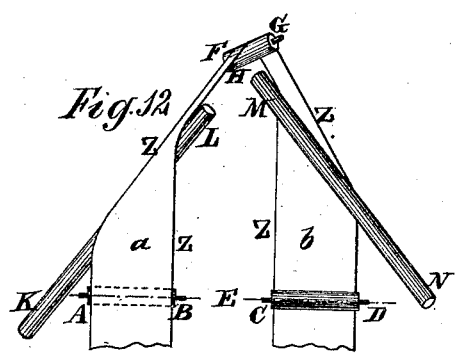
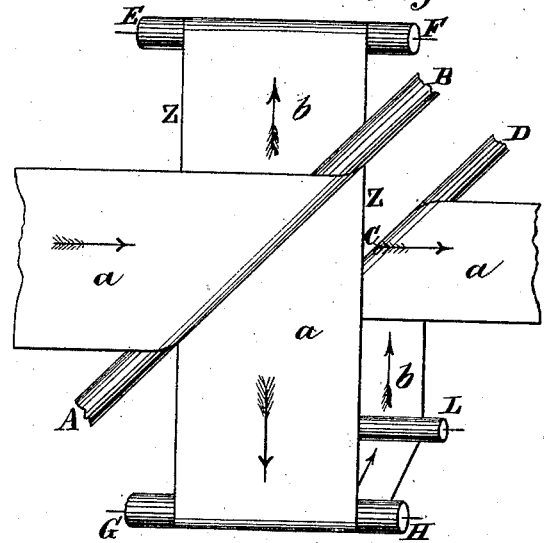
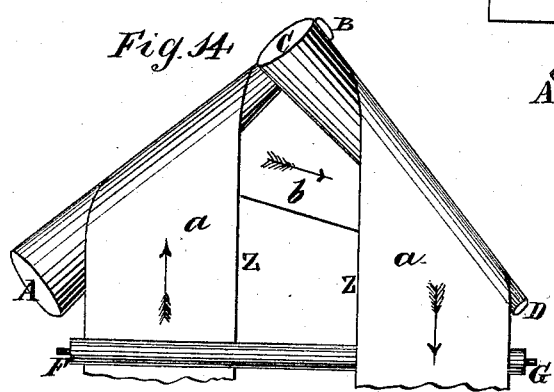
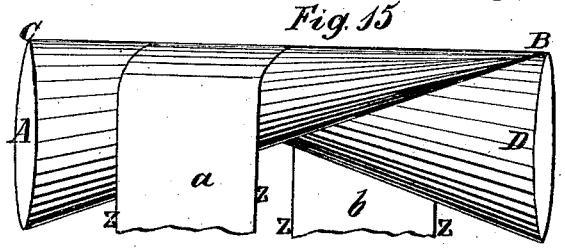
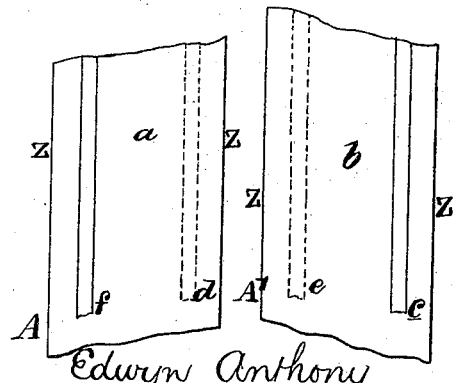

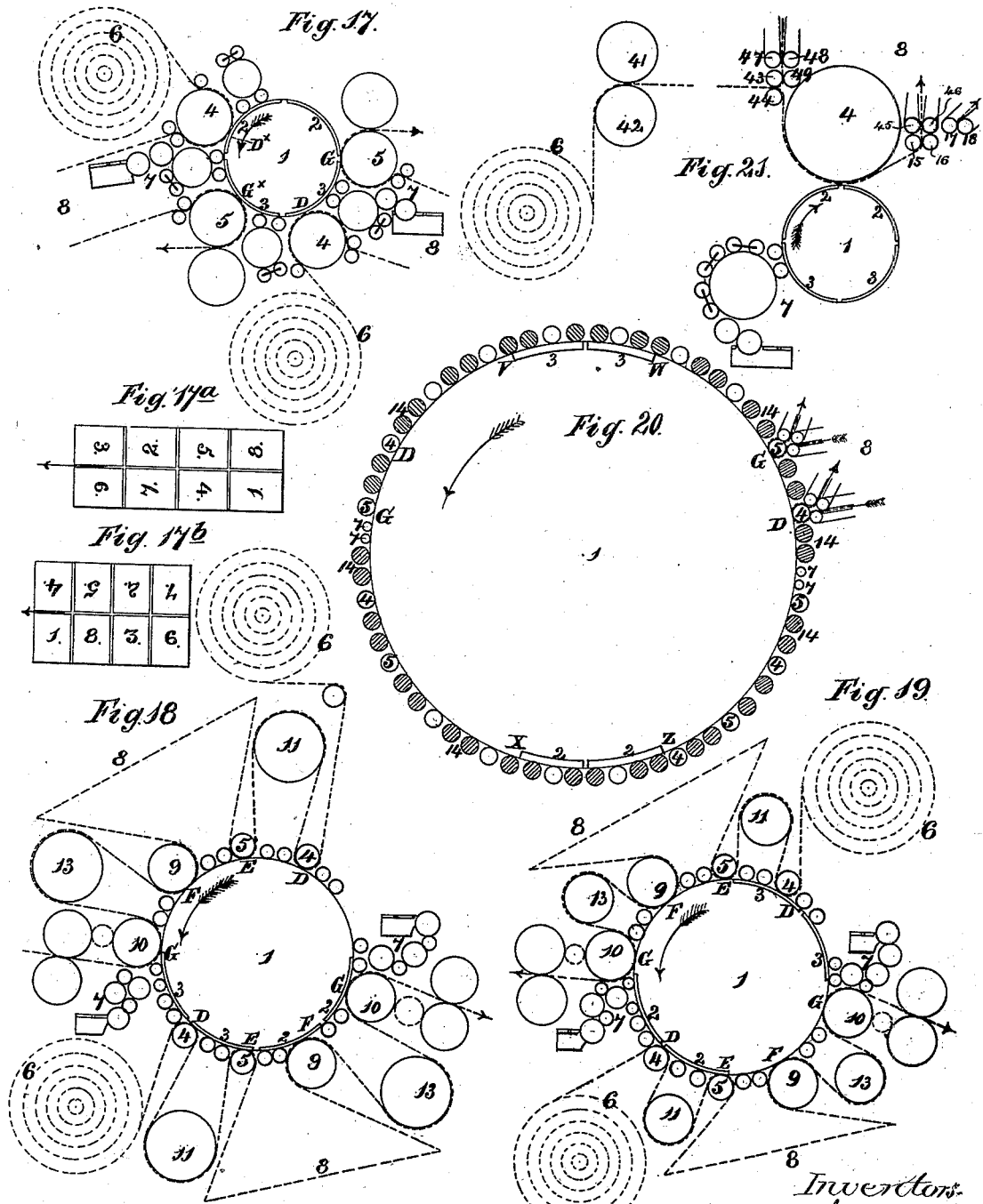

10 Sheets—Sheet 5.
E. ANTHONY & W. W. TAYLOR.
Printing-Machine.
No. 212,880. Patented Mar. 4, 1879.
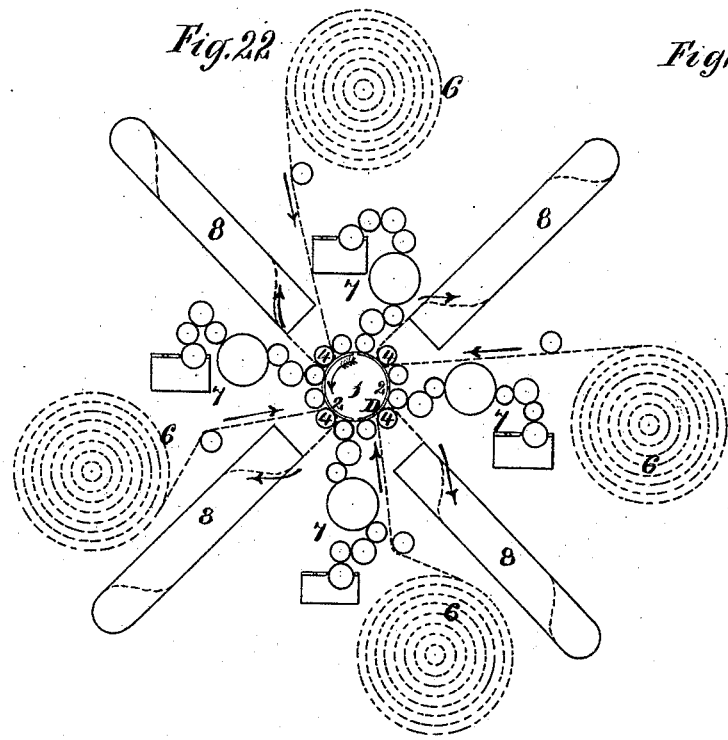
Fig. 22.
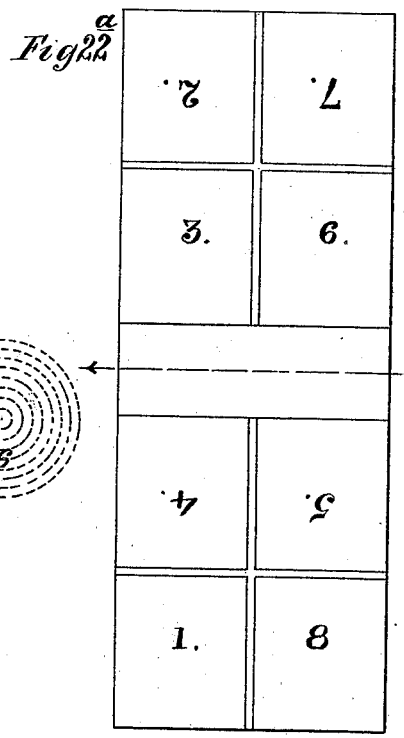
Fig. 22ª
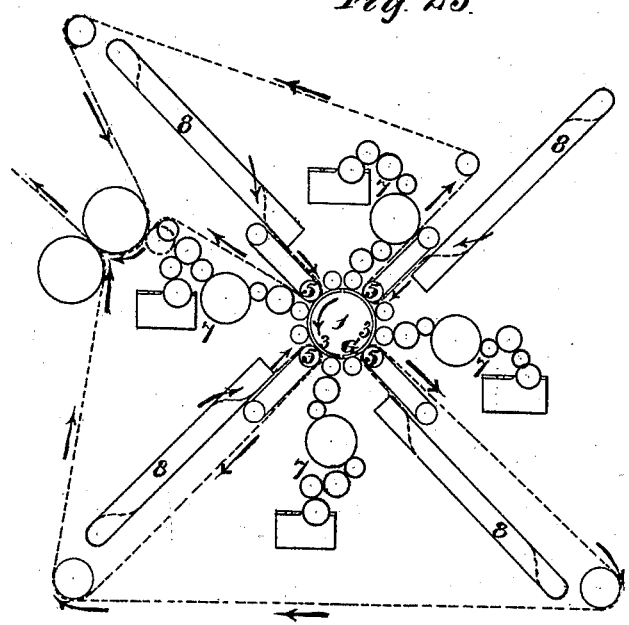
Fig. 23.
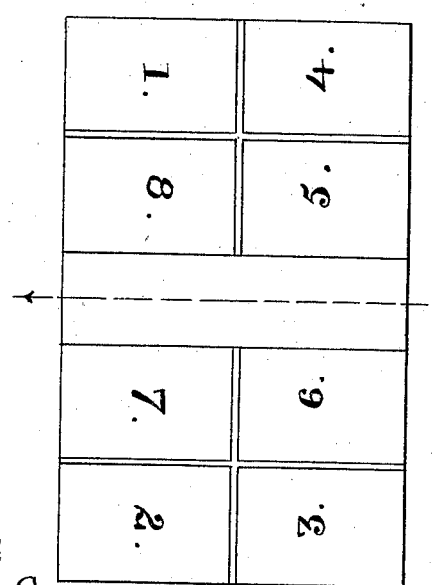
Fig. 22ᵇ
Witnesses
Hermann Moessner
Harry Smith
Edwyn Anthony
William Wilberforce Taylor
by their Attorneys
Howson and Son E. ANTHONY & W. W. TAYLOR.
Printing-Machine.

No. 212,880. Patented Mar. 4, 1879.

E. ANTHONY & W. W. TAYLOR.
Printing-Machine.
No. 212,880. Patented Mar. 4, 1879.
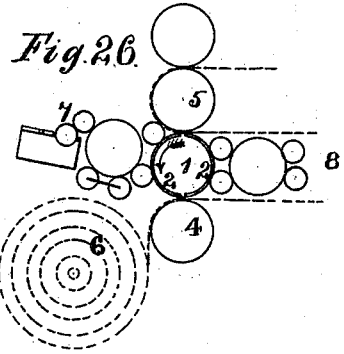
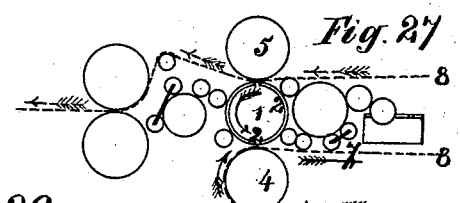
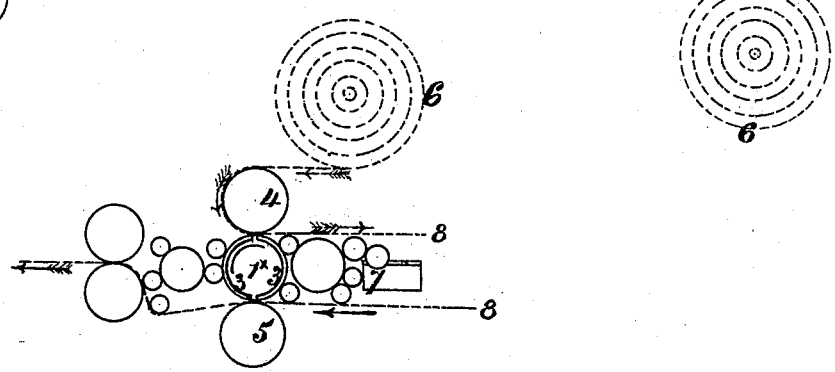
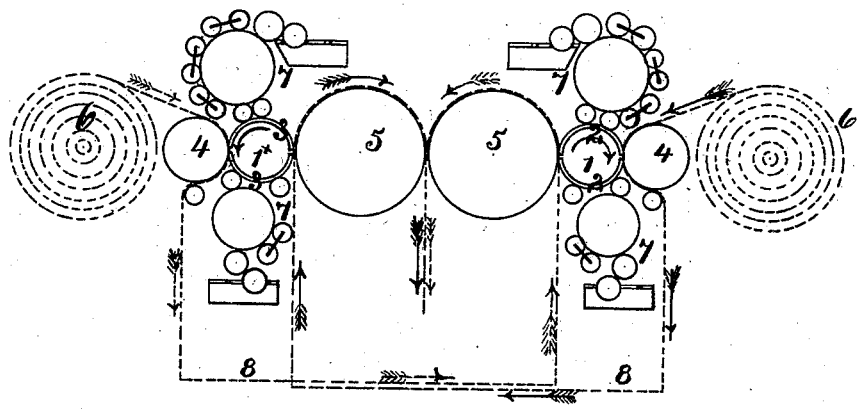

10 Sheets—Sheet 8.

E. ANTHONY & W. W. TAYLOR.
Printing-Machine.

No. 212,880. Patented Mar. 4, 1879.

Witnesses
Hermann Moessnyer
Harry Smith

Inventors
Edwyn Anthony
and
William Wilberforce Taylor
by their Attorneys
Howson & Son

N. PETERS, PHOTO-LITHOGRAPHER, WASHINGTON, D. C.

E. ANTHONY & W. W. TAYLOR.
Printing-Machine.

No. 212,880.          Patented Mar. 4, 1879.

Witnesses
Hermann Moessner
Harry Smith

Inventors
Edwyn Anthony
and
William Wilberforce Taylor
by their Attorneys
Howson and Son 10 Sheets—Sheet 10.
E. ANTHONY & W. W. TAYLOR.
Printing-Machine.
No. 212,880. Patented Mar. 4, 1879.
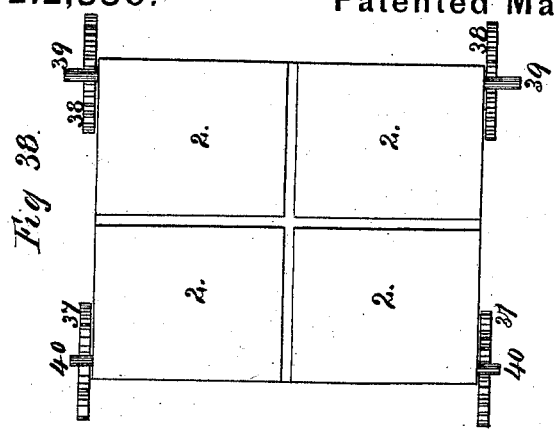
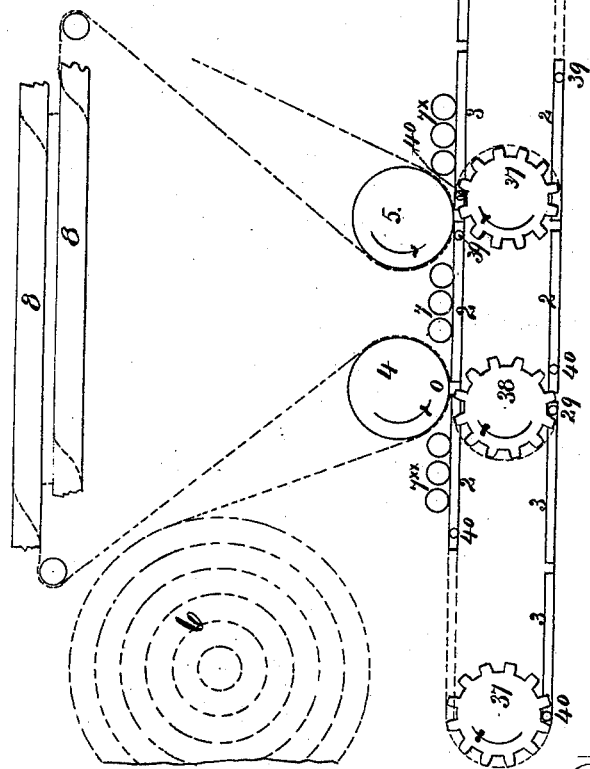
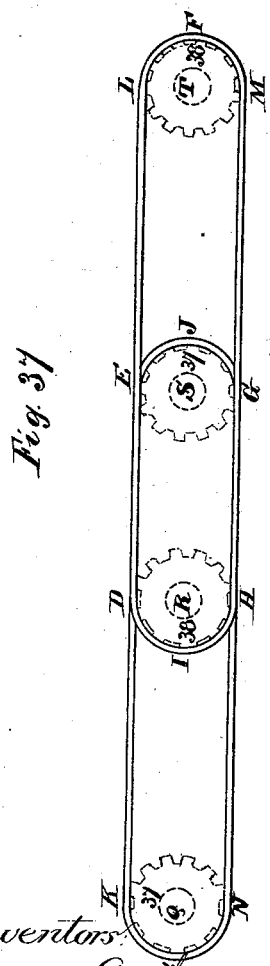

UNITED STATES PATENT OFFICE.

EDWYN ANTHONY, OF HEREFORD, AND WILLIAM W. TAYLOR, OF CAMBRIDGE, ENGLAND.

IMPROVEMENT IN PRINTING-MACHINES.

Specification forming part of Letters Patent No. 212,880, dated March 4, 1879; application filed November 1, 1876; patented in England, March 27, 1875.

*To all whom it may concern:*

Be it known that we, EDWYN ANTHONY, of Hereford, in the county of Hereford, England, and WILLIAM WILBERFORCE TAYLOR, of Cambridge, in the county of Cambridge, England, have invented certain new and useful Improvements in Printing-Machines; and we hereby declare that the following specification, when taken in connection with the accompanying drawings, is such a full, clear, and exact description thereof as will enable those skilled in the art to make and use the same.

Our said invention relates more particularly to the machines which are usually called "web-feeding printing-machines;" but it may be also applied to many other classes of printing-machines.

One of the chief objects of the invention is to print on both sides of two or more rolls of paper simultaneously, using only one set or any required number of sets of forms.

Our invention, however, may likewise be used in making machines which print from only one roll at a time, and in constructing machines which are not web-feeders.

In web-feeding machines as heretofore constructed, each edge of the paper, as it is carried along from the roll from which it is unwound, forms a plane curve.

According to our invention we arrange turning-surfaces in conjunction with the type and impression cylinders in such a manner that the paper is turned and twisted in any required direction, its edges forming curves of double curvature, whereby facility is afforded for obtaining the following results, *videlicet:*

First. The opposite side of the paper may be brought again into contact with the same type-cylinder.

Second. Either side of the paper may be brought at pleasure into contact with a type-cylinder having its axis in the same straight line as the first type-cylinder, and revolving in either direction at pleasure.

Third. Either side of the paper, at pleasure, may be brought into contact with a type-cylinder the axis of which is parallel to the first cylinder, and which revolves in either direction at pleasure, the type on such cylinder being situate at any part of its surface, imagining the axis to be indefinitely prolonged in both directions.

Fourth. Either side of the paper may be brought at pleasure into contact with a type-cylinder which is arranged in any position relatively to the first cylinder, and which has its axis at any required angle thereto, such second type-cylinder revolving in either direction at pleasure, and having the type situate at any part of the surface of the cylinder, imagining the axis to be indefinitely prolonged in both directions.

Fifth. More generally the axes of the type-cylinders, of the roll of paper, and of the cutting-cylinder may be any lines in space.

In order to insure the operation of printing being performed in a satisfactory manner, it is essential that the paper should have an approximately equal tension throughout its breadth, that it should not be liable to pucker or crumple during its traverse, and that it should follow an undeviating course. These conditions are fulfilled if the paper is conducted over a surface made in such a way that it is a developable surface, and that it possesses two generators, such that the geodesics perpendicular to one of them are also perpendicular to the other, such geodesics being curves of double curvature. By employing one or more of such surfaces in combination or not with one or more rollers, we effect any of the results hereinbefore enumerated. Any developable surfaces made to satisfy the conditions given above may be used.

In carrying out our invention we employ, in order to obtain such surfaces, cylinders, cones, or helicoids, (using those terms in the sense given to them in mathematical treatises,) or parts of the same, either alone or in combination.

As an example of the mode of carrying out our invention, when it is required to bring the other side of the paper into contact with a type or stereotype cylinder whose axis is in the same straight line in the first type or stereotype cylinder, and which revolves in the same direction, we employ a turning-cylinder, whose axis is parallel to the plane of the paper, and which makes an angle of forty-five degrees in the axes of the type or stereotype cylinders, for the purpose of turning the direction of motion of the paper through ninety degrees. We employ a second cylinder, whose axis is parallel to the same plane and at right angles to the first turning-cylinder, to again turn the direction of motion of the paper through ninety degrees. Thus the direction of motion of the paper is reversed, and at the same time is transferred laterally by more than the breadth of the paper.

Our invention is also applicable to those cases in which the sheet is cut before being printed on either side, or when printed on one side, the paper after cutting being caused to traverse the proper surfaces by means of tapes, arranged in the manner hereinbefore described in reference to the endless webs.

The following surfaces are very convenient, as being easy to make practically: First, a cylindrical surface or a part of a cylindrical surface; second, a conical surface or a part of a conical surface; third, a surface formed by bending a rectangular plate into any convenient shape.

And in order that our said invention may be fully understood, we shall now proceed more particularly to describe the same, and for that purpose we shall refer to the several figures on the annexed sheet of drawings.

The several figures on Sheets 1, 2, and 3 of the accompanying drawings are diagrams illustrating the mode of constructing and arranging various modifications of turning apparatus in accordance with our invention.

The several figures on Sheets 4 to 10, inclusive, are intended to show the general features of some examples of printing-machines constructed according to our invention.

When cylindrical surfaces are used they must be placed so as to satisfy the following conditions:

First, two consecutive cylinders when produced touch one another internally or externally at some point, but not necessarily along a line.

Secondly, if a number of straight lines be drawn parallel to and to represent the axes of a series of cylinders arranged as lastly mentioned, so as to form a zigzag figure, then the sum of all the angles made toward the same parts is equal to the sum of all the angles made toward the other parts. For example, let A B, B C, C D, E F, F G, G H, K L, &c., Fig. 1, Sheet 1, represent straight lines drawn parallel to the axes of any arrangement of cylinders which satisfies the first condition, then the sum of the angles A B C, C D E, E F G, G H K, &c., must equal the sum of the angles B C D, F G H, H K L, &c., all the angles made toward the same parts being included in the first set, and all the angles made toward the other parts being included in the second set.

And, thirdly, the length of each of the cylinders must be sufficient to satisfy the conditions hereinafter given in formulæ No. 4.

When the position $A^2 B^1$ of the web on A B is given, and likewise the angle $A A^2 A^1$ it makes with A B on entering, then its position on B C is given approximately by drawing straight lines in the plane A B C from the points $A^2 B^1$, so that the angles $B B^1 B^2$ and $B A^2 C^1$ are each equal to $A A^2 A^1$.

If the web were folded through various angles in several places with all its folds parallel to its breadth, its course could be made to represent the course of the paper from the roll to the cutting apparatus in any existing web-machine. By taking the folds at various angles to the breadth according to our invention, the paper may be caused to follow such a course that after leaving one cylinder either side of it shall travel over another cylinder which is rotating in either direction, and which occupies any position in space relatively to the first cylinder, the folds of the paper representing cylindrical surfaces, over which the paper passes, and which are such as to satisfy the condition that the surface of any one always touches the surface of the next.

From the above general considerations, and by the aid of the results and statements and examples which follow, there will be no difficulty in constructing a great variety of apparatus.

In some positions of two cylinders relatively to one another, it is not possible to bring the paper from one to the other by the use simply of one turning-cylinder. By employing, however, in addition one or more intermediate rollers, the desired result may always be attained, provided that the axes of the cylinders are not parallel.

By the use of an intermediate roller or rollers we can also always cause the web to wrap exactly half-way round the turning-cylinder while using a turning-cylinder of any convenient diameter.

As an example, let A B C D, Fig. 2, represent cylinders of radii $r$ $r^1$, respectively; $d$, the perpendicular distance between their axes; $r_1$, the radius of the turning-cylinder X; $r_2$, the radius of an intermediate roller, $A^1 B^1$.

The cylinders are revolving in the direction indicated by the arrows, and it is required to bring the same side of the Sheet Z into contact with A B and C D. Draw a plane perpendicular to the common perpendicular of the axes of the two cylinders, and at a distance from the axis of the cylinder A B equal to $d - (r^1 + 2 r_1 + r_2.)$ If it is desired to bring the other side of the web into contact with the turning-cylinder, this distance must be taken equal to $d - (r^1 - 2 r_1 + r_2.)$ Anywhere in this plane place the intermediate roller $A^1 B^1$, provided that it is opposite the cylinder A B, that it is placed so that the condition hereinafter mentioned in reference to diagram, Fig. 3, does not arise, and that its axis makes the same angle with C D as A B makes therewith.

If the reverse side of the paper is to be brought into contact with C D, the only difference is that the axis of $A^1 B^1$ must be placed so as to make with C D the angle supplementary to that between A B and C D.

To find the position of the turning-cylinder X to turn the paper from $A^1 B^1$ to C D, let $C^1 D^1$, Fig. 3, Sheet 1, be the projection of the axis of the cylinder C D on a plane through the axis of $A^1 B^1$ parallel to the axis of C D. (This would be the ground plan if A B and C D are horizontal.) Draw $C^1$ E, $D^1$ F perpendicular to $C^1 D^1$; draw $A^1$ E, $B^1$ F perpendicular to $A^1 B^1$, intersecting $C^1$ E and $D^1$ F in E and F; join E F; draw $G^1 H^1$ parallel to E F, and at a distance from it equal to $\frac{\pi r_1}{2}$, and on the side of E F toward O, the point of intersection of $A^1 B^1$, $C^1 D^1$. Then $G^1 H^1$ is the projection of the axis of the turning-cylinder.

The condition hereinbefore referred to arises that $G^1 H^1$ must not intersect either $A^1 B^1$ or $C^1 D^1$, and the position of $A^1 B^1$ is to be chosen so as to fulfill this condition, it is evident from Fig. 3 that its position may be chosen in an infinite number of ways so as not to intersect $G^1 H^1$. If $C^1 D^1$ intersects $G^1 H^1$ then the paper must be taken from the turning-cylinder onto another subsidiary roller, and thence onto C D. This roller must be placed opposite C D, so that its projection on the same plane does not intersect $G^1 H^1$, and so that the plane of the paper in traveling from it to C D is perpendicular to the common perpendicular of the two cylinders. $A^2 B^2$ represent a suitable position of the roller $A^1 B^1$, and $A^3 B^3$ the projection of the axis of the turning-cylinder when the reverse side of the paper is to be brought in contact with the cylinder C D.

The following construction may be used when it is desired and when it is possible to turn the paper by the use of simply one turning-cylinder: Let it be assumed that it is required to take the paper from the top of one cylinder, A B, to the top of another cylinder, C D; and, for the sake of simplicity, suppose that the cylinders are horizontal. Round the axis of A B describe a cylinder whose radius equals the sum of the radii of the cylinder A B and of the turning-cylinder; round the axis of C D describe a cylinder whose radius is equal to the difference of the radii of C D and the turning-cylinder. If it is desired to bring the other side of the web into contact with the turning-cylinder the converse construction must be made—that is, round the axis of A B describe a cylinder whose radius equals the difference of the radii of the cylinder A B and of the turning-cylinder; round the axis of C D describe a cylinder whose radius is equal to the sum of the radii of C D and of the turning-cylinder.

The axis of the turning-cylinder must be placed so as to touch the surfaces of these two cylinders. Considering Fig. 3 as a plan view of the cylinders A B and C D, and the same construction to be made as before, then the projection on this plan of the axis of the turning-cylinder will lie between $G^1 H^1$ and a line at a distance from $G^1 H^1$ equal to $\left(\frac{\pi}{2} - 1\right) r_1$, that is, equals $\cdot 5707963 \times r_1$, approximately. This statement is true only so long as $\beta$ is not greater than $\pi$; but in every case likely to arise in practice it is a near approximation.

The position of the axis being thus given within narrow limits, its actual position may be found by adjustment. For example, if the turning-cylinder is not more than four inches diameter, this adjustment will always be less than one inch and three-sixteenths.

In the diagram, Fig. 4, Sheet 1, P Q is the line at which the Sheet Z comes in contact with the cylinder, and $P^1 Q^1$ is the line in which it leaves it, $a$ representing one side of the sheet and $b$ the other. If $a =$ the acute angle, the edge of the paper makes with the axis on entering and leaving the cylinder, $\beta =$ the supplement of the angle (expressed in circular measure—that is, equals $\cdot 0174533 \times A$ approximately where A is the number of degrees contained in the said supplement) between the plane of the paper before entering the turning-cylinder and the plane of the paper after leaving it—in other words, the angle through which the paper is turned by the turning-cylinder.

$r =$ radius of the cylinder; $b =$ breadth of the web. Then—

Length of paper wrapped round cylinder—i. e., length of the edge of the paper from P to $P^1$, or Q to $Q^1 = \dfrac{r, \beta}{\sin a.}$ \hfill (1)

Distance from P to $P^1$, or Q to $Q^1$, measured along the axis $= r, \beta \cos a.$ \hfill (2)

The distance from P to $P^1$, measured in the plane of the paper, and perpendicular to its direction of motion before coming in contact with the turning-cylinder $= r, \beta \cos a.$ \hfill (3)

The distance measured along the axis, from the point P to the point $Q^1$—in other words, the shortest possible length of the axis of the cylinder $= \dfrac{b + r, \beta \cos a}{\sin a.}$ \hfill (4)

Length of paper from P M to $Q^r N^1 = \dfrac{b \cos a + r \beta}{\sin a}.$ \hfill (5)

Cosine of half the angle between P M and $Q^1 N^1 = \cos a \sin \tfrac{1}{2} \beta.$ \hfill (6)

It will be obvious that it is not advisable to make the axis the least possible length; some margin should be allowed on each side. The cylinder on the side A may be terminated by a plane parallel to P R, and perpendicular to the plane of the paper P T, and at any distance chosen from P R. Similarly the cylinder on the side of B may be terminated by a plane parallel to $Q^1 S^1$, and perpendicular to the plane of the paper $Q^1 V^1$.

A particular case of the formulæ hereinbefore given and numbered 1, 2, 3, 4, 5, and 6, which is of the greatest use, is when $a$ is equal to half a right angle, and $\beta$ is equal to two right angles.

The formula numbered 1 then becomes $r, \times 4.4428827$, (approximately;) the formula numbered 2 then becomes $r, \times 3.14159265$, (approximately;) the formula numbered 3 then becomes $r, \times 2.2214413$, (approximately;) the formula numbered 4 then becomes $r, +3.14159265 +b, \times 1.4142135$, (approximately;) the formula numbered 5 then becomes $b + r, \times 4.4428827$, (approximately;) the formula numbered 6 then becomes angle between P M, and $Q^1 N^1$ is a right angle.

By imagining the radii of the cylinders to be indefinitely small they become straight edges. By making the necessary modifications straight edges may be substituted for cylinders in all the apparatus of which we give examples, except where otherwise stated. We do not recommend their use, as the paper is then more liable to tear.

In using plates originally flat, but bent so as to take the paper from one cylinder to another, the only conditions are that the plate should not be crumpled in the process of bending, and that if the folds are not all in the same direction the paper must be passed between two such plates, or the plate must be severed along the lines of contrary flexure and placed so that the paper may not leave it. By the aid, also, of the principles and rules we have laid down, and with the assistance of the examples of apparatus which we give, an almost unlimited number of modifications of apparatus may be devised, all substantially the same in principle as those in the examples given; for example, cones and cylinders may be used in combination, or cones and plates, and the like. In all cases, however, we prefer cylinders, as before stated.

The above methods are applicable to any of the following cases: first, when the sheet is cut after it has been printed on both sides; second, when it is cut after receiving only one impression; third, when it is cut before it is printed on either side; and, fourth, when the paper is delivered into the machine in sheets—in other words, when the machine is not a web-feeder. The paper, as soon as it is in sheets, is caused to traverse the proper surfaces by means of tapes or blanketing, or other equivalent, arranged as hereinafter described.

According to our invention, the forms may be placed in many ways, and machines made in accordance with it are capable of great variety of construction. The following division into five classes shows some of the most important of them:

In class I the forms for both sides of the paper are placed on the same cylinder.

In class II the forms for both sides of the paper are distributed between two cylinders on the same axis. This class may conveniently be divided into two: A, when the cylinders revolve in the same direction; B, when they revolve in contrary directions.

In class III the forms for both sides are distributed between two cylinders whose axes are parallel. This class may be conveniently divided into two: A, cylinders revolving in contrary direction; B, cylinders revolving in the same direction.

In class IV the forms for both sides are distributed between two cylinders whose axes are inclined to one another. This class may be conveniently divided into two: A, cylinders revolving in contrary directions; B, cylinders revolving in the same direction.

In class V the forms for both sides are placed on a flat surface. This class may be conveniently divided into two: A, when the flat surface oscillates backward and forward in a straight line, and the straight lines containing the corresponding edges of the forms for each side are perpendicular to the direction of motion of the forms; B, when the motion of the forms is that described with reference to Fig. 36, Sheet 8.

If required, any number of type-cylinders arranged in accordance with the foregoing methods may be used, and all or any of the different classes may be combined in one machine.

The invention is also applicable to color-printing machines, the sets of forms which have to receive inks of different colors being substituted for the forms for both sides, care being taken to select a suitable turning apparatus, so as to bring the same side again in contact with the type.

In the examples which we have given of particular forms of machines made in accordance with our invention, the details of the inking, cutting, folding, or delivery appliances, and the like, are for the most part omitted for the sake of simplicity and clearness, as we have not endeavored to show the whole of the parts of the machine not connected with our invention, nor the most convenient, nor even convenient, arrangements of such parts, because they may all be constructed in any usual and suitable manner.

Fig. 5, Sheet 2, represents an apparatus for transferring the web laterally by more than its breadth, and at the same time reversing the paper. The sheet Z is represented as leaving the roller A B and passing beneath and over the cylinder E F, then over and beneath the cylinder F G, and over the roller C D, $a\ b$ representing reverse sides of the sheet, as before. The cylinders E F, G F are fastened together at right angles to one another. The under surfaces of A B and E F are flush with one another, and the upper surfaces of E F and F G are also flush, and the under surface of F G is flush with the upper surface of C D. The space B C depends upon the diameters of the cylinders E F, F G, and upon the margin allowed at F.

It is convenient, but not necessary, to fix the apparatus so that the angles between F E, A B, and F G, D C are each equal to forty-five degrees, the point F so that the perpendicular from it falls midway between the points B and C, and the cylinders E F, F G equal to one another. The minimum distance B C will equal $4.4428827 \times r_1$ ($r_1$ being the radius of a turning-cylinder) plus twice the margin that must be allowed at F for variations in the travel of the paper, and may be greater to any required extent.

The length of paper in the apparatus may be calculated by the formulæ hereinbefore given. The paper may be conveyed from C D by carrier-rollers to any parallel and opposite roller. Thus by the above or any similar apparatus one side of the web may be brought into contact with a cylinder, and then the other side into contact with any parallel cylinder or cylinder on the same axis, the cylinders revolving in the same direction, and not being opposite to one another, but separated by more than the breadth of the paper.

In the diagram, Fig. 6, Sheet 2, A B, C D represent two cylinders of any suitable diameters, by preference equal, fixed at right angles to one another, and with any required distance between them. E F and G H are rollers parallel to one another, and each making an angle of forty-five degrees with the cylinder A B. The upper surface of the roller E F is flush with the under surface of the cylinder A B, and the upper surface of the roller G H is flush with the upper surface of the cylinder C D. K L represent one of two rollers arranged at right angles to the rollers E F, G H, and making an angle of forty-five degrees with the cylinder C D. These rollers are parallel to one another, and fixed so that the upper surface of the one and the under surface of the other are made to come flush with the upper and under surfaces of A B, C D, respectively. By shifting either of these rollers parallel to itself the length of paper in the apparatus may be adjusted.

If preferred, a single roller may be substituted for the two rollers K L, such roller having its diameter equal to the sum of the diameters of the two fixed cylinders A B, C D plus the distance between them, and being fixed so that it makes an angle of forty-five degrees with the cylinder C D, and that its upper surface is flush with the upper surface of A B, and its under surface flush with the under surface of C D.

The line M, the common perpendicular to the axes of the two cylinders, and passing through them, must be at a distance from the center line of the web (with reference to its position before entering the apparatus) given by the expression 2.2214413 multiplied by $\dfrac{r + r^1}{2}$, (where $r$ $r^1$ are the radii of the fixed cylinders A B, C D,) and on the side toward the roller E K. The length of paper in the apparatus can be calculated by means of the formulæ hereinbefore given. By this apparatus we can bring the other side of the web onto the same cylinder, or onto another cylinder parallel to it, the two cylinders being opposite one another, and revolving in the same direction. By moving the cylinder C D parallel to itself, still keeping it at the same distance from the cylinder A B, the web may be transferred laterally by any breadth whatever, including the exact breadth of the web. It should be noticed that the same side $a$ of the web Z is brought into contact with both turning-surfaces. This condition is fulfilled in all the examples of apparatus we give.

The web enters at the roller E F. Its side $a$, being uppermost, passes under and over the cylinder A B, over and under the roller or rollers K L, under and over the cylinder C D, and away over the roller G H, its side $b$ being uppermost on leaving. It is not necessary that the cylinders C D and A B should be equally inclined to the rollers; but we have given the particulars in that case as being generally the most convenient in practice. In this case, as in the case of the whole of the examples we give, the apparatus is susceptible of modification in a variety of ways without departing from the principles we have laid down or introducing anything new.

Fig. 7, Sheet 2, shows an apparatus which may be employed for the same purpose as the apparatus illustrated in Fig. 6. A B, B C, C A are cylinders, fixed so as to form an acute-angled triangle of any convenient shape, the cylinders not being necessarily of the same diameters. Z is the sheet, of which $a\,b$ are opposite sides. The apparatus may be threaded in more ways than one; but in every case the angle the edge of the sheet makes with the axis in passing over the cylinder B C must equal the angle B A C, in passing over the cylinder A C must equal the angle A B C, and in passing over the cylinder A B must equal the angle B C A.

When threaded as shown in Fig. 7, (in which case the sheet Z passes over and under the cylinder A B, then under and over the cylinder A C, and finally over and under the cylinder B C,) the upper sides of C B, C A must be flush with one another, and the under sides of A B, A C must be flush with one another.

The length of paper in the apparatus, and the position of the apparatus in order that the web on entering and leaving may be accurately opposite itself, may be calculated by the principles laid down in the formulæ hereinbefore given.

Fig. 8, Sheet 2, represents an apparatus for simply transferring the web Z laterally by its breadth, or by more than its breadth. By this or any similar apparatus one side of the web may be brought into contact with a cylinder, and then the other side brought into contact with a parallel cylinder, or a cylinder whose axis is in the same line, and which revolves in the contrary direction, the cylinders not being opposite one another, but separated by the breadth or more than the breadth of the web. In the example shown the cylinders A B, C D are parallel, and their under surfaces are flush with one another. The roller E F is parallel to the breadth of the sheet before it enters the turning apparatus, and its upper surface is flush with the upper surface of C D. The web Z passes over and under the cylinder A B, under and over the cylinder C D, and then over and under the roller E F, the side $a$ being uppermost on entering, and the side $b$ uppermost on leaving, as shown. The length of paper, &c., may be calculated as in the preceding examples.

Fig. 9, Sheet 2, represents an apparatus similar to that shown in Fig. 6, but threaded differently. It is useful when it is required to bring the web outside the frame-work of the machine. The rules previously given apply to its construction; but the upper surface of G H is flush with the under surface of A B. The under surface of C D is flush with the upper surface of E F; also, M must be at a distance from the center line of the web (with reference to its position before entering the apparatus) given by the expression 2·2214413 multiplied by half the difference of the radii of the turning-cylinders, and it is taken toward the roller G H if the radius of A B is greater than the radius of C D, and toward the roller E F if the radius of C D is greater than the radius of A B. The web Z passes over and under the cylinder C D and roller E F, and under and over the roller G H and cylinder A B. The side $a$ is uppermost both on entering and leaving, as shown. $b$ represents the different positions of the opposite side.

Instead of G H two parallel rollers, with any distance between them, may be used, so that there may be any required distance between the positions of the web on entering and leaving the apparatus.

The apparatus, Fig. 10, Sheet 3, is intended for use in cases where it is required to bring the web from one cylinder to a parallel and opposite cylinder revolving in the contrary direction (the opposite sides of the web being brought in contact with the cylinders) when there is reason to take it out of its direct course. The turning-cylinders A B and C D are parallel to one another, and are equally inclined to the two parallel rollers E F and G H and to the breadth of the web. It is convenient to take this angle equal to forty-five degrees. The web Z passes under and over the cylinder A B, then at the back of the rollers E F and G H, and over and under the cylinder C D. It will be observed that in this figure (which represents a perspective view of the apparatus) the sides $a$ of the two portions of the web come opposite to one another, the various positions of the reverse side being indicated by $b$.

The apparatus, Fig. 11, Sheet 3, which is substantially the same as that Fig. 8, is employed for transferring the web Z laterally by its breadth or more than its breadth, the same side $a$ being uppermost. The two portions of the web are parallel and in the same plane, so that the web makes one complete wrap round the cylinder A B, and the angles the edge makes with the axis on entering and leaving are the same. By diminishing this angle the amount of transference is increased, and vice versa; also, the amount of transference increases with the diameter of the cylinder, and vice versa; in fact, $6·2831853 \times r \cos a$ gives that distance.

Fig. 12, Sheet 3, represents another apparatus for transferring the web laterally. A B and C D are the axes of two equal cylinders in the same straight line. E is the middle point between B and C. E H is any straight line through E perpendicular to B C, and it is taken any convenient length. It may be as long as desired; but in all cases a sufficient length in proportion to the breadth of the web is to be allowed. The roller F G is fixed with its central point at H, and its axis anywhere perpendicular to E H. By properly choosing the angle it makes with B C, the distance B C may be made any length required. K L, M N are turning-cylinders, fixed according to the directions hereinbefore given in reference to the diagrams, Figs. 2, 3, and 4. F G may rotate as the edge of the paper on entering and leaving is perpendicular to its axis. The web Z passes over the cylinder K L, then over and behind the roller F G, and under the cylinder M N, $a$ $b$ representing opposite sides of the web. If A B and C D are parallel, but not in the same straight line E may be taken, the middle point of B C and E H may be drawn perpendicular to the plane A B, C D. The rest of the construction will be the same as before.

Fig. 13, Sheet 3, represents an apparatus very similar to that shown in Fig. 10. It is intended for a similar purpose, and may be employed when it is found more convenient to use the apparatus in this form than in the form shown in Fig. 10. The web Z passes over and under the cylinder A B and rollers E F and G H, and then at the back of the roller K L, and under and over the cylinder C D, as indicated by the arrows. $b$ represents the reverse side of the web to that which $a$ does.

Fig. 14 represents an apparatus in which cones are employed for turning the web, and is substantially the same as Fig. 5. The axes of the cones A B, C D are fixed at right angles to one another, and the cones are of the same pitch. The thin end of the cone A B is sunk into the thick end of the other, C D, until the surfaces become flush with one another. The web Z passes under the roller F G, over first the cone A B, and then the cone C D, and leaves, passing over the roller F G, $a b$ representing the reverse sides of the web. The plane of the paper is changed by a distance which, by using different cones, can be regulated at will, and it is also transferred laterally by more than its breadth. This breadth may be varied by shifting the apparatus bodily in a lateral direction.

Fig. 15, Sheet 3, represents another arrangement of cones. A B and C D are the cones, which are of the same pitch, and fixed so as to touch a common plane along parallel straight lines. They are both on the same side of the plane, and their vertices are in opposite directions. By this apparatus the plane of the paper is transferred laterally, and the distance through which it is transferred may be varied by changing the pitch of the cones or by changing the distance between them.

No result can be obtained by the use of cones which cannot be obtained by the use of cylinders, and the latter are always more convenient in practice, because the conditions of their use are much simpler, and we therefore in every case prefer to employ cylinders.

The apparatus, when desired, may be taped on either or on both sides of the web. When, as in Fig. 10, the sheet, before entering and after leaving any turning apparatus whatever, is opposite to itself, and the same edge of the sheet is opposite to the same edge, then a tape put in on either side the sheet will come out opposite itself, and thus its two ends may be brought together in the usual way, unless there are obstacles to prevent this, when skew-pulleys may be used.

When the sheet, before entering and after leaving any turning apparatus whatever, is opposite to itself, but the same edges of the sheet are not opposite to one another, as in Fig. 16, which represents a perspective view, where the edge at A is the same edge as the edge at $A^1$, the sides $a\ b$ being opposite to each other, then it is convenient to take each tape round both sides of the sheet. For example, let a tape go through the turning apparatus, starting from the inner side of the sheet at $c$, it will come out outside the sheet at $d$, conduct it by rollers over the apparatus to outside the sheet at $e$, and again take it through the turning apparatus, and it will come out inside the sheet at $f$ and opposite to where it first entered at $c$. The two ends can then be joined in the usual way.

When the sheet, before entering and after leaving any turning apparatus, is not opposite itself, or when, in the case illustrated in diagram, Fig. 16, it is desired to tape only one side of the web, it will be in general necessary to use skew-pulleys to bring the two ends of a tape together. Turning apparatus may be used for the same purpose; but we prefer skew-pulleys, fixed in any usual and suitable manner.

When two turning apparatus are used, and the sheets on them are running in opposite directions, returning apparatus may often be avoided by conducting the same tape over both apparatus. This process is illustrated in the machine, Figs. 33 and 34.

Before proceeding to describe some examples of machines constructed in accordance with our invention, it will be convenient to enumerate the following terms employed in formulæ hereinafter given:

Let $b$ equal the length or breadth of the printed sheet, according as its motion is in the direction of its length or of its breadth.

Let $m$ equal any number, including zero. The meaning of this is that in the formulæ which follow, $m$ may be taken, at pleasure, equal to nothing, or equal to 1, or equal to 2, &c.

Let K equal the distance after cutting between successive sheets when they have reached their ultimate distance of separation.

In all the machines hereinafter described the forms may be placed so as not to occupy the whole width or length (as the case may be) of the printed sheet, but only half that distance. The length of printing-surface will thus be made twice as great, and the roll will be only half-width; but each roll will print only half the number for the same surface-speed of the type. In some cases this method will be useful. For example, it may obviate the necessity of having two sets of forms, as, for example, in the machine, Fig. 36.

Fig. 17, Sheet 4, represents a machine of Class I. 1 is the type-cylinder, which carries the forms 2 2 3 3, for printing both sides of the sheet. 4 5 4 5 are the impression-cylinders. 6 6 are the two rolls of paper, and 7 7 are the inking apparatus. Between the impression-cylinders 4 and 5—say, at 8—the sheet is turned by a turning apparatus, such as those described with reference to Figs. 6, 7, or 9. The paper may be cut before or after it is printed. If after printing, the circumference of the type-cylinder equals $2\ b$. If before printing, the circumference of the type-cylinder equals $2\ b + 2\ K$. The distance the paper travels from D to G must be adjusted so that the sheets are accurately backed. This distance must equal the arc D G $+ (2\ m+1)\ b$ when the web is cut after printing; equal the arc D G $+ (2\ m+1)\ (b+K)$ when it is cut before printing. The forms must not be put on in the usual way; but the set which prints one side must be turned round, as it were, in reference to the set which prints the other side. There are more ways than one of putting on the forms, examples of which are illustrated by Figs. $17^a$ and $17^b$.

The paper is conducted from the rolls 6 between the type-cylinder 1 and the impression-cylinders 4, where it receives an impression upon one side. It is then turned by the turning apparatus at 8, and, passing between the type-cylinder 1 and impression-cylinder 5, receives an impression on the reverse side, after which it is delivered to the cutting and folding or delivery mechanism, all of which may be arranged in any usual and suitable way.

Fig. 18, Sheet 4, represents another machine of the same class as Fig. 17, the circumference of the type-cylinder of which equals 4 $b$ when the paper is cut after printing, and equals 4 $(b+K)$ when the paper is cut before printing.

Distance paper travels from D to E equal to arc D E$+2 b$ $(2 m+1,)$ cutting after printing.

Distance paper travels from D to E equal to arc D E$+2$ $(b+K)$ $(2 m+1,)$ cutting before printing.

Distance from F to G equal to arc F G$+2 b$ $(2 m+1,)$ cutting after printing.

Distance from F to G equal to arc F G 2 $(b+K)$ $(2 m+1,)$ cutting before printing.

Distance from E to F equal to arc E F$+b$ $(2 m+1,)$ cutting after printing.

Distance from E to F equal to arc E F$+$ $(b+K)$ $(2 m+1,)$ cutting before printing.

In this machine the forms 2 2 3 3 for both sides of the sheet are placed close to one another, and the directions for placing them given with reference to Fig. 17 apply to this case also.

1 is the type-cylinder; 2 2 3 3, the forms; 4 4 5 5 9 9 10 10, the impression-cylinders; 6 6, the rolls of paper; 7, the inking apparatus. The paper from the rolls 6 6 enters between the type-cylinder 1 and the impression-cylinder 4, thence passes round the roller 11, and between the type-cylinder 1 and the impression-cylinder 5. The combined effect of the two impression-cylinders 4 5 is to produce an impression continuously on one side the sheet. The paper having received an impression on one side is then conducted to a turning apparatus, situate, say, at 8, and constructed in accordance with the methods hereinbefore described—for example, those illustrated by Figs. 6, 7, and 9. The paper then passes round the impression-cylinder 9, roller 13, and impression-cylinder 10, and thus receives a continuous impression on its other side. It is then delivered to the cutting and folding or delivery mechanism, which may be arranged in any usual and suitable manner.

Fig. 19, Sheet 4, represents a similar machine to the one last described, except that the forms 2 2 and 3 3 are placed on opposite sides of the type-cylinder 1 in lieu of side by side. The direction for placing the forms given with reference to Fig. 17 also applies in this case.

Circumference of cylinder equal to 4 $b$, cutting after printing.

Circumference of cylinder equal to 4 $(b + K,)$ cutting before printing.

Distance from D to E equal to arc D E $+ b$, $(4 m + 1,)$ cutting after printing.   (1)

Or, $+ b$ $(4 m + 3,)$ cutting after printing.   (2)

Distance from E to F equal to arc E F $+ b$, $(4 m + 1,)$ cutting after printing.   (3)

Or, equal to arc E F $+ 2 b$, $(2 m + 1,)$ cutting after printing.   (4)

Or, equal to arc E F $+ b$, $(4 m + 3,)$ cutting after printing.   (5)

Distance from F to G equal to arc F G $+ b$, $(4 m + 1,)$ cutting after printing.   (6)

Or, equal to arc F G $+ b$, $(4 m + 3,)$ cutting after printing.   (7)

where formulæ (1) (3) (6), or (1) (4) (7), or (2) (4) (6), or (2) (5) (7) must be taken together.

When the sheet is cut before it is printed $b + K$ must be substituted for $b$ in the above formula.

1 is the type-cylinder; 2 2 and 3 3, the forms, the forms 2 2 being arranged on the type-cylinder diametrically opposite to those 3 3. 6 6 are two rolls of paper; 1 5 9 10, the impression-cylinders, and 7 the inking apparatus. The paper passes from the rolls 6 round the impression-cylinders 4, then over the rollers 11 to the impression-cylinders 5, after which it is turned by means of similar apparatus to that described with reference to Figs. 17 and 18, which apparatus is arranged between the impression-cylinders 5 and 9, say at 8. The paper is then conducted round the impression-cylinders 9, rollers 13, impression-cylinders 10, and, finally, is conducted to any suitable cutting and folding or delivering mechanism.

In the drawings, Figs. 17, 18, and 19, the web is represented as being cut after it is printed. In all the machines there illustrated it may be cut before printing, in which case the paper must, of course, be conducted round the impression-cylinders, &c., by means of tapes or other equivalent. The formulæ give directions for both cases, and methods of taping the turning apparatus have been already given.

Fig. 20, Sheet 4, is intended to explain generally how by our methods any desired number of rolls can be printed from at the same time, the number being limited only by practical considerations as to size of type and impression cylinders. In this machine the paper must be cut before it is printed. It should be remarked, however, that when the paper is cut before it is printed the number of rolls employed is not a sufficient criterion of the number printed in any specified time.

The circumference of the type-cylinder, say, equal to $c$, is anything not less than 2 $b$, $b$ being the width or length (as the case may be) of the largest sheet the machine is to print. With inking-rollers arranged as shown in the drawings the circumference of the type-cylinder must be considerably greater than 2 $b$, to allow of parts of the cylinder being used as inking-surfaces; but when it is desired that the cylinder should be small, the inking apparatus may be otherwise arranged. Then $b$ being the breadth or length of sheet, it is evident that the cylinder is printing during $\frac{2}{c} b$ part of its time. Therefore the surface-speeds of the paper before and after cutting must be to one another in the ratio $2 b : c$. By varying the speed of the roll different-sized sheets may be printed.

The type-cylinder 1 carries the forms 2 2 3 3 for both sides of the sheet, 2 2 being placed opposite to 3 3, so that the arc V X equals the arc Z W. The directions for placing the forms given with reference to Fig. 17 apply in this case also. 4 5 are the impression-cylinders; 7 7, inking-rollers, and 14 14 distributing-rollers.

The sheets as they pass under the impression-cylinder 4 receive their first impression, and are then turned by a turning apparatus situate, say, at 8, receiving an impression on the reverse side as they pass under the impression-cylinder 5.

The turning apparatus may consist of any one of those described as applied to the machine illustrated in Fig. 17. The distance the paper travels from D to G must equal the arc $$D G + (2 m + 1)\frac{c}{2}.$$

Fig. 21, Sheet 4, represents a machine of the same class as those previously described, but having only one impression-cylinder, and the paper must be cut before it is printed. 1 is the type-cylinder, carrying the forms for both sides of the sheet, arranged in a similar manner to those illustrated in Fig. 17. 4 is the impression-cylinder; 6, the roll of paper; 7, the inking apparatus. A sheet cut from the roll 6 by the cutting-cylinders 41 42 is conducted between the rollers 43 44, and passes between the type-cylinder 1 and the impression-cylinder 4, where it receives an impression on one side. It then passes between a pair of rollers, 15 16, (carried in a suitable frame so as to oscillate in the manner hereinafter described,) and between the rollers 45 46 to a turning apparatus situate, say, at 8, and such, for example, as those illustrated in Figs. 6, 7, or 9. The paper is then conducted between the rollers 47 48, and thence between the rollers 43 49 to the impression-cyilnder 4 again, when it receives an impression on the reverse side of the sheet, after which it passes between the rollers 15 16, which have been oscillated or moved by any suitable arrangement of mechanism to a position immediately opposite a pair of rollers, 17 18, which latter receive the sheets and conduct them away to be folded or delivered, as desired.

It is obvious that the machine should be taped in any usual or suitable manner. In this arrangement the rollers and the rest of the machine should be driven at twice the speed of the roll of paper and the cutting-cylinders.

Figs. 22 and 23, Sheet 5, represent, respectively, a front elevation and transverse vertical section of a machine of the second class, and for printing from four rolls of paper.

The forms are arranged on two cylinders on the same axis. As the cylinders rotate in the same direction they may, if preferred, form one long cylinder, and similarly in the case of the impression-cylinders and rollers. The position of the forms is illustrated in the diagrams 22$^a$ and 22$^b$.

The paper is brought from the portion of the cylinder represented in Fig. 22 to that represented in Fig. 23, by any convenient turning apparatus made in accordance with the methods hereinbefore described, such, for example, as those illustrated by Figs. 5 and 14 of the drawings.

If it is wished that the web shall be transferred by exactly its breadth, the modification of Fig. 6, suggested with reference to that figure, or a similar modification of Figs. 7 or 9, may be used. When the web is transferred by more than its breadth there may be a framework in the middle of the machine; in fact, the machine might consist, as it were, of two distinct machines, connected only by the four turning apparatus, Fig. 22 representing the one machine, and Fig. 23 the other. The blanket of cylinder 5 is made long by means of a carrier-roller, in order to reduce the set-off.

The paper from the rolls 6, Fig. 22, passes between the impression-cylinders 4 and the type-cylinder 1, and receives an impression from the forms 2 2, and is then conducted round the turning-cylinders 8, Fig. 22, and the turning-cylinders 8, Fig. 23, to the impression-cylinders 5, where it receives an impression on the reverse side, after which it is delivered from the machine in any suitable manner. In the drawings the four rolls are conducted to the same pair of cutting-cylinders.

In order to allow of the removal or changing of the forms, we form in the frame of the machine a semicircular slot or slots, the lower part of which is slightly below the surface of the type-cylinder when the forms are removed, and the width of which slightly exceeds the thickness of the forms. When it is required to change the forms, two consecutive pairs of inking-rollers are removed and the impression-cylinder between them is slightly raised, when the forms may be slipped on or off the type-cylinder through the before-mentioned slot.

Figure 25:
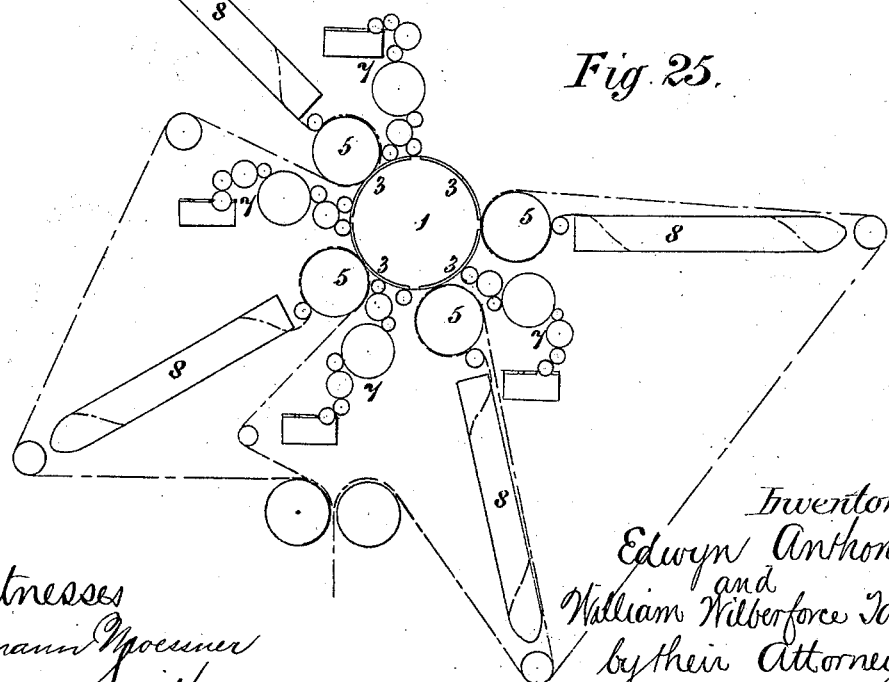

Figs. 24 and 25, Sheet 6, represent similar views of a machine almost identical with that last described, and illustrated by Figs. 22 and 23, Sheet 5. The difference consists in making the type-cylinder twice as large, so as to carry two sets of forms. This enables the impression-cylinders to be made larger, and the forms to be taken on or off in the usual way.

Fig. 26, Sheet 7, represents another modification of a machine of the same class, intended to print from a roll of double width. In this arrangement the paper may be cut up the center, either before or after it has been printed upon, by means of a circular knife, or otherwise placed in any suitable position. 1 is the type-cylinder, which is in every way the same as that described with reference to Figs. 22 and 23, in the case when the cylinder forms one long cylinder, and there is no space between the forms for each side. 4 and 5 are the impression-cylinders; 6, the roll of paper to be printed; and 7, the inking apparatus. The paper from the roll 6 enters between the type-cylinder 1 and the impression-cylinder 4, and receives an impression from the forms for both sides. It then passes to the turning apparatus, situate, say, at 8, (and which may be constructed according to the methods described with reference to Figs. 6, 7, and 9,) and from thence between the type-cylinder 1 and the impression-cylinder 5, where it receives another impression, but on the reverse side of the paper to that which received the first impression. The paper is then conducted to any usual and suitable cutting and folding or delivery mechanism.

The machine we are about to describe is of the second division of the second class, and is illustrated by Figs. 27 and 28, Sheet 7, which represent, respectively, a front elevation and transverse vertical section. In this case the forms are arranged upon two type-cylinders whose axes are in the same straight line, and which revolve in opposite directions. 1 1 are the type-cylinders; 2 2 and 3 3, the forms; 4 and 5, the impression-cylinders; 6 6, the rolls of paper to be printed; 7, the inking apparatus. The paper from the roll 6, Fig. 27, enters between the impression-cylinder 4 and the type-cylinder 1, and is then turned by means of a turning apparatus, situate, say, at 8. and constructed upon the principle described with reference to and illustrated by Fig. 8, after which it passes between the impression-cylinder 5 and the type-cylinder $1^\times$, Fig. 28, and is then conducted to any usual and suitable cutting and folding or delivery mechanism.

Fig. 29 illustrates a machine of the A division of the third class, in which the forms are carried on two cylinders arranged opposite one another and revolving in opposite directions. 1 $1^\times$, are the type-cylinders, carrying the forms 2 2, 3 3; 4 and 5, the impression-cylinders; 6 6, two rolls of paper; 7 7, inking apparatus. The paper from one of the rolls 6 passes between the impression-cylinder 4 and the type-cylinder 1, which carries the forms 2 2, and thence through a turning apparatus, such, for example, as that described with reference to and illustrated by Fig. 10 of our drawings, and situate, say, at 8. The effect of the turning apparatus is to bring the web outside the frame of the machine, and then in again, thus conducting the two webs each out of the way of the other. After having been turned the paper passes between the impression-cylinder 5 and the type-cylinder $1^\times$, which carries the forms 3 3, and is thence conducted between the two impression-cylinders 5 5 (which may also serve as cutting-cylinders, if desired) to any usual and suitable cutting and folding or delivery apparatus.

Figure 30:
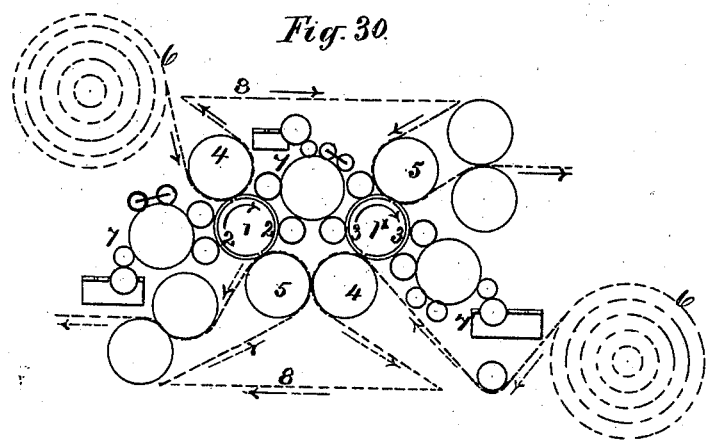

Fig. 30, Sheet 8, is an illustration of a machine of the B division of Class 3, in which the paper from two rolls is being printed with forms placed on two type-cylinders arranged opposite each other and revolving in the same direction. 1 and $1^\times$ are the type-cylinders, carrying, respectively, the forms 2 2 and 3 3. 4 and 5 are the impression-cylinders; 6 6, rolls of paper; 7 7, inking apparatus. The paper from one of the rolls 6 passes between the impression-cylinder 4 and the type-cylinder 1, and receives an impression on one side thereof. It is then conducted through a turning apparatus, situate, say, at 8, such, for example, as those described with reference to and illustrated by Figs. 6, 7, and 9. The paper then passes between the impression-cylinder 5 and the type-cylinder $1^\times$, and receives an impression on the reverse side, after which it is conducted away to any usual and suitable cutting and folding or delivery mechanism. The paper from the other roll travels in the reverse direction on the type-cylinders to that just described, as will be clearly seen on reference to the drawing.

Figure 31:
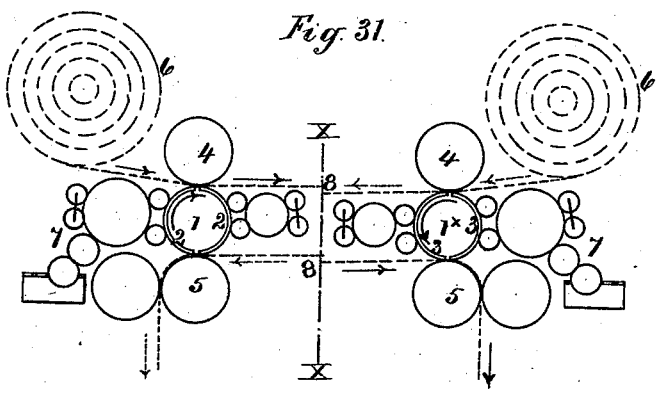

Fig. 31, Sheet 8, represents a machine constructed in accordance with the A division of the fourth class. The forms are carried on two type-cylinders inclined at an angle to each other and revolving in opposite directions. The two parts of the machine on opposite sides of the line X X are perfectly symmetrical, and may be inclined to one another at any desired angle. 1 $1^\times$ are the type-cylinders, carrying, respectively, the forms 2 2 and 3 3. 4 4 and 5 5 are the impression-cylinders; 6 6, rolls of paper; 7 7, inking apparatus. The paper from the rolls follows the course indicated by the arrows, and the operation will be perfectly understood from the preceding description without further explanation. The turning apparatus may be such as that illustrated in Fig. 2. A B may be taken to represent the type-cylinder, and C D an impression-cylinder.

Figure 32:
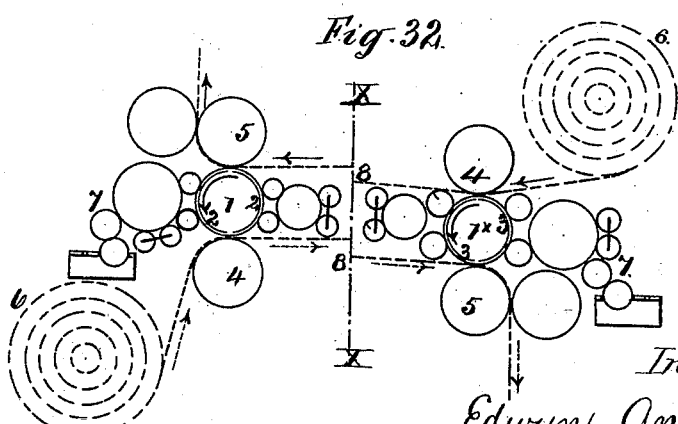

Fig. 32 represents a similar machine to that shown at Fig. 31, and is of the B division of the fourth class. Both of the type-cylinders are made to rotate in the same direction, and the paper from one roll passes over both of the type-cylinders, and that from the other roll under the same, as shown by the arrows. The turning apparatus may be such as that illustrated by Fig. 4.

Figures 33, 34:
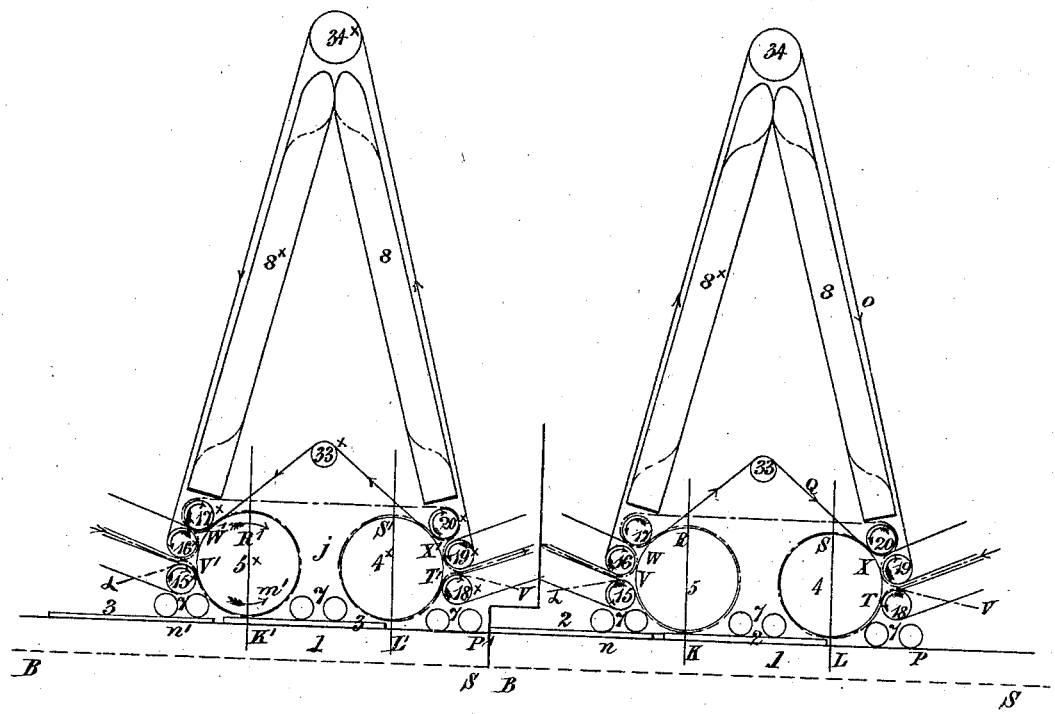

Figs. 33 and 34, Sheet 9, represent, respectively, a front elevation and transverse vertical section of a machine of the A division of Class V. The table 1, which carries the forms 2 2 3 3, oscillates backward and forward in the usual manner, (the forms being placed as described in reference to Figs. 22 and 23,) and drives the impression-cylinders 4 5 $4^\times$ $5^\times$, so that they rotate first in one direction and then in the other. The inking-tables, inking-rollers, distributing-rollers, apparatus for the delivery and folding, &c., of the papers may be arranged according to the customary methods. The rollers 15 16 17 are placed very close to, but not in contact with, the cylinder 5, and they constantly rotate in the directions indicated by the arrows. Similarly the rollers 18 19 20 are placed close to the cylinder 4, and $15^\times$ $16^\times$ $17^\times$ close to $5^\times$, and $18^\times$ $19^\times$ $20^\times$ close to $4^\times$. The impression-cylinders 5 $5^\times$ have their axes in the same straight line, and they may, if preferred, form one long cylinder. Similarly for the cylinders 4 $4^\times$. The rollers 15 15ˣ have their axes in the same straight line; but they revolve in contrary directions, as shown by the arrows. Similarly for the rollers 16 16ˣ 17 17ˣ 18 18ˣ 19 17ˣ 20 20ˣ. Two webs are employed, and the webs must be cut into sheets before printing on either side. This may be effected in any of the usual ways; and from the one web the sheets enter (with the proper interval between each sheet) between the rollers 15ˣ 16ˣ, Fig. 33, and from the other web between the rollers 18 19, Fig. 34. The sheets are timed to enter the rollers 18 19 so that a sheet is carried round in one direction by the cylinder 4, and the next sheet in the other direction, and so on in succession. The sheets are thus printed on one side from the forms 2 2, and leave between the rollers 19 20. They then pass round the turning apparatus 8, Fig. 34, which is such an apparatus as that illustrated in Fig. 5, and enter between the rollers 20ˣ 19ˣ to receive an impression on the other side by the impression-cylinder 4ˣ in a similar way to that described with reference to the cylinder 4, after which they pass out between the rollers 19ˣ 18ˣ to any convenient delivery or folding apparatus. In precisely the same way the sheets from the other roll enter between 15ˣ 16ˣ, and are printed on one side by the impression-cylinder 5ˣ, pass out between 16ˣ 17ˣ over the turning apparatus 8ˣ 8ˣ, pass between the rollers 16 17, and are printed on the other side by the impression-cylinder 5, and thence between the rollers 15 16 to the delivery or folding apparatus.

The conditions for timing, &c., are as follows: $N^1 P^1 N P$ is the distance of the inside travel of the table, and $N K = L P = N^1 K^1 = L^1 P^1$. X is the point in which the line bisecting the angle 20 4 19 (4 being the center of the cylinder) cuts the cylinder, and T the point where the line bisecting the angle 19 4 18 cuts the cylinder, and similarly for the points $V W X^1 T^1 V^1 W^1$. The distance between every two successive sheets as they enter between the rollers 15ˣ 16ˣ from the one roll and between 19 18 from the other must be equal to N P. The travel of the paper from $W^1$ to W and from X to $X^1$ must equal $2(m+1)(NP+b)-c$, where $c$ is the circumference of an impression-cylinder, and $b$ the breadth or length of a paper, according to the way in which the forms are placed. $2 V R = 2 S T = K L = K^1 L^1 = 2 S^1 T^1 = 2 V^1 R^1$. Arc K V W (which $=$ arc $K^1 V^1 W^1 =$ arc L T X $=$ arc $L^1 T^1 X^1$) must be not greater than K N.

The cutting-cylinders of each roll should be geared in such a way that the leading edge of the sheet may arrive at the right moment with reference to the position of the forms.

The dotted lines represent the course of the margin-tapes. They are driven by the impression-cylinders, and therefore run first in one direction and then in the other. The end $a$ runs into the end $\beta$, and the end $\gamma$ into the end $\delta$, the tapes being carried sufficiently far to be out of the way of the travel of the table.

On the rollers 15 17 18 20 15ˣ 17ˣ 18ˣ 20ˣ there are provided loose pulleys, over which the margin-tapes run, and these pulleys are slightly larger than the rollers. Thus the margin-tapes can run first one way and then the other, while the above rollers and the tapes they carry run constantly in the same direction.

Instead of margin-tapes gripers may be employed, or the margin-tapes may be differently arranged. By varying the speed of the roll and the size of sheet cut different sizes of sheets may be printed.

No adjustment of the parts shown in the drawings is necessary, care being taken that the center line of the forms remains in the same place whatever the size of the forms, and that the margin-tapes are moved, if necessary, so as still to run in the margins.

The course of the tapes which conduct the papers from the impression-cylinder 4 to the impression-cylinder 4ˣ, and similarly from 5ˣ to 5, is shown in the drawings.

For one side of the sheet let a tape start from Q. It then passes round the roller 20; thence over the turner 8 8 and round the roller 20ˣ to the roller 33ˣ; thence round the roller 17ˣ and over the turner 8ˣ 8ˣ to the roller 17, and thence over the roller 33 back to the point Q.

For the other side of the sheet let a tape start from O. It then passes round the roller 19 to the roller 20; thence over the turner 8 8 to the roller 20ˣ, and then to the roller 19ˣ and over the roller 34ˣ to the roller 16ˣ; thence to the roller 17ˣ and over the turner 8ˣ 8ˣ to the roller 17; thence to the roller 16, and over the roller 34 back to the point O.

One sheet when it enters the rollers 15ˣ 16ˣ will be taken round in the direction of the arrow $m'$ and out between 17ˣ 16ˣ. The next sheet will be taken in the direction of the arrow $R'$, and then out between the rollers 16ˣ 17ˣ, and so on in succession.

Figure 35:
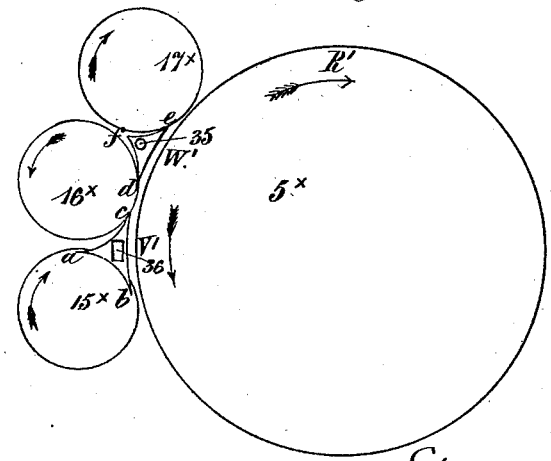

In order to insure the sheets following the proper directions we make use of guides, as shown in Fig. 35 on an enlarged scale.

The guide $d e f$ is capable of occupying three positions, and is caused to occupy these positions at the right times by a cam or other suitable means. It is pivoted on the rod 35, and at one time it occupies the position shown in the drawing, allowing the sheet to go round the impression-cylinder 5ˣ. At another time it is moved round the rod 35, so that the point $d$ presses against the cylinder 5ˣ. When in this position it prevents the sheet from continuing its course round the impression-cylinder 5ˣ in the direction of the arrow $R'$, Fig. 35, and allows space for it to go round the roller 16ˣ. At another time the point $e$ presses against the cylinder 5ˣ, and when in this position it prevents the sheet from continuing its course round the impression-cylinder 5ˣ in the direction of the arrow $V^1$, and allows space for it to pass round the roller 17ˣ.

The guide terminates at $d$ and $e$ in prongs, so that they may enter grooves in the rollers $16^\times$ $17^\times$ cut for the purpose in places where there are no tapes.

The guide $a\ b\ c$ is capable of occupying two positions, and is moved by a cam or by other suitable means. One of its positions is shown in the drawings, the other is when it occupies the same position relatively to the roller $16^\times$ that it now does relatively to the roller $15^\times$. It occupies the position shown in the drawing while the impression-cylinder $5^\times$ rotates in the direction of the arrow R′, Fig. 35.

The guide $a\ b\ c$ moves in a curved slot, 36, the curve of which is the arc of a circle concentric with the center of the cylinder $5^\times$. The ends $a\ b\ c$ are prongs for the same purpose as those at $d$ and $e$.

A guide similar to that $a\ b\ c$ is required between the rollers $15^\times$ and $16^\times$, between $20^\times$ and $19^\times$, between 16 and 17, and between 19 and 18; and a guide similar to that $d\ e\ f$ is required between $18^\times$ and $19^\times$, between $16^\times$ and $17^\times$, between 15 and 16, and between 20 and 19.

Figs. 36, 37, and 38, Sheet 10, represent a machine of the B division of Class V. In this machine the paper may be cut either before or after it is printed. Two sets of forms must be used, or only one set if rolls of half-breadth are employed.

The forms may be arranged in various ways. We suppose two sets to be used, as shown in the drawings, placed alternately first one side and then the other, the forms for one side being turned round with reference to the forms for the other, as explained with reference to Fig. 17. 4 and 5 are the impression-cylinders, and between them the paper is turned by an apparatus, 8, such, for example, as those shown in Figs. 6, 7, and 9. The circuits C D E J G H and D E F G H I (see Fig. 37) are in length each equal to $4\ b$ or $4\ (b+K)$, according as the sheet is cut after or before printing.

The travel of the sheet from O to P must equal the distance O P plus $(2\ m\ +\ 1)\ b$, web cut after printing must equal O P plus $(2\ m\ +\ 1)\ (b\ +K,)$ web cut before printing. The ends of the circuits consist of the halves of two equal circles, and the remaining parts of the circuits are straight, as shown in the drawing. The forms pass continuously round and round these circuits, the two shorter pins, 40 40, passing round the former circuit, and the two longer pins, 39 39, passing round the latter circuit.

The pins 39 39 are retained in the circuit D E F G H I by means of a slot in the form of that circuit, and the pins 40 40 are retained in the circuit C D E J G H by means of a similar slot. These slots coincide from D to E, and from G to H. The remaining parts of the latter slot—*videlicet*, E J G and H N C K D—are not sufficiently deep to admit the long pins, 39.

While the forms are on the level they are driven by a straight rack and pinion, which is to be so placed as not to be in the way of the ascent and descent of the forms. During their ascent or descent they are driven by the wheels 37 38, which continuously revolve in the same direction, and which may be connected together by links; the distance between the pins 39 40, and also between 40 39, must be a multiple of the distance between two successive teeth of the wheels 38 38 37 37. The pins 40 and 39 need not be placed at the extremities of the forms, as shown in Fig. 38; but the distances Q R and S T must each be equal to the distance between the pins 40 and 39. By this arrangement the forms are continually passing under the impression-cylinders 4 and 5, the travel of any form being always horizontal while it is in contact with either impression-cylinder, and they descend so as always to remain parallel to themselves. Between D and E—that is, during the time they are receiving an impression—the forms may be supported by rollers.

The set of inking-rollers 7 is in connection with any suitable inking apparatus adapted for continuous inking, and the sets $7^\times$ and $7^{\times\times}$ are each in connection with one adapted for intermittent inking. An inking apparatus is required for each of the two latter sets, because the set $7^\times$ will not ink sufficiently one end of each set of forms, and the set $7^{\times\times}$, which will sufficiently ink this end, will not sufficiently ink the other end. The combined action of the two will produce an even distribution over the whole surface of the forms.

In cases where there is room, in lieu of the inking-rollers and apparatus $7^{\times\times}$ $7^\times$, an inking apparatus may be substituted, placed between the wheels 38 and 37, so as to ink the forms while they are on the lower level.

By using three instead of two sets of forms two webs may be used, (with four impression-cylinders,) as the space between D and E will then be increased by the breadth of a sheet. 6 represents the roll of paper; and 8, the turning apparatus, as before.

In lieu of iron impression-cylinders covered with one or more blankets, according to the usual way, the iron part of the cylinder may be made less in diameter than the intended size of the impression-cylinder, and be covered with a continuous coating of vulcanized india-rubber or similar material. The rubber may be half an inch thick, more or less, according as experience shows the best thickness for it. The object of thus covering the cylinders is to be able to print with cylinders of small diameter, and to reduce the wear of the type, and to produce a good impression on the paper with less pressure between the type and impression cylinders.

Throughout our specification the word "type" is used to denote the substance or substances, type, stereotype, electrotype, stones, combinations of any or of all of them, or any other substance or substances which produces the impression on the paper, and the word "paper" is intended to denote any material upon which it is required to print.

The symbol $\pi$ is used, as is customary, to denote the ratio of the circumference of a circle to its diameter.

Having now described and particularly ascertained the nature of our said invention, and the manner in which the same is or may be used or carried into effect, we would observe that the following is not claimed:

The combination, with the type-cylinder, of a web-turner, to turn a web of paper printed by said cylinder upon one side, whereby the opposite side of the web may be presented to the same type-cylinder to be printed; also, a type-cylinder in combination with a web-turner adapted to turn a web of paper printed upon one side at one end of the cylinder, so that its opposite side may be printed by type arranged in the cylinder in the direction of its length beyond the type used to print the first side of the web.

What we do claim, and desire to secure by Letters Patent, is—

The combination, in a printing-machine, of printing mechanism with inclined cylinder or cylinders, or other inclined turning devices, substantially as described, whereby a web or sheets of paper, after receiving an impression on one side from one printing-surface, may be returned to the same printing-surface or to one parallel therewith, and receive an impression on the opposite side, as set forth.

In witness whereof we have signed our names to this specification in the presence of two subscribing witnesses.

EDWYN ANTHONY.
    W. W. TAYLOR.

Witnesses to the signature of the said Edwyn Anthony:
 CHAS. MILLS,
  47 *Lincoln Inn Fields, London.*
 FREDK. C. DYER,
  *Same place.*

Witnesses to the signature of the said William Wilberforce Taylor:
 J. R. JUSTICAN,
  *Clerk to Mr. Budge, Solicitor and Notary Public.*
 THOS. J. HELLARD.